UNITED STATES PATENT OFFICE.

SOLOMON AXELRAD AND IRVING HOCHSTADTER, OF NEW YORK, N. Y.

PROCESS OF OBTAINING CETYL ALCOHOL.

1,290,870.  Specification of Letters Patent.  Patented Jan. 14, 1919.

No Drawing.  Application filed January 14, 1918. Serial No. 211,881.

*To all whom it may concern:*

Be it known that we, SOLOMON AXELRAD, residing at the city of New York, borough of Manhattan, in the county and State of New York, and IRVING HOCHSTADTER, residing at the city of New York, Far Rockaway, borough of Queens, Queens county, in the State of New York, citizens of the United States, have invented certain new and useful Improvements in Processes of Obtaining Cetyl Alcohol, of which the following is a full, clear, and exact specification.

Our invention relates to improvements in processes of obtaining cetyl alcohol and has for its object to provide a simple, practical and efficient process for obtaining the same.

Further, the invention has for its object to provide a process by means of which cetyl alcohol may be obtained in large quantities and at a low cost.

Further, the invention has for its object to provide a process by means of which a large yield of cetyl alcohol is obtained from the material subjected to treatment.

Further, the invention has for its object the obtaining of cetyl alcohol by the distillation of the calcium soap of spermaceti.

Other objects will in part be obvious and in part be pointed out hereinafter.

To the attainment of the aforesaid objects and ends our invention consists in the method or process embodying the successive steps hereinafter fully described and then pointed out in the claims.

In the obtaining of cetyl alcohol from spermaceti and other cetyl esters we proceed as follows:—

We take, for example, about 15 parts of melted spermaceti and add to the same a saponifying medium which by preference should consist of about 20 parts of calcium oxid containing about five (5) per cent. of water. The mixture of the above ingredients is then heated in a suitable vessel for about six hours, and stirred occasionally during that period.

The purpose of mixing the spermaceti with the calcium oxid is to saponify the spermaceti in a manner similar to the saponifying of a mixture in soap making by means of an alkali soluble in any of the common solvents. It will of course be understood, that any other substance besides calcium oxid such as salts of sodium, potassium, magnesium, etc., may be employed as the saponifying medium.

Next, the mixture is permitted to cool to atmospheric temperature.

Next, the mass is placed into a suitable still for distillation. By applying heat until the mass attains a temperature of about 100° C. frothing occurs which is due to the escape of water contained in the mixture.

After all the water has been driven off the temperature is raised to about 340° C. whereupon the cetyl alcohol distils off in the form of white fumes, which form, upon cooling, oily drops, becoming upon solidification, a pure white fatty body somewhat resembling or suggesting a body like paraffin. It will of course be understood, that, if the distillation is performed *in vacuo*, the same result may be attained at a much lower temperature.

The solidified fatty body thus obtained has a melting point of 49.5° C.

This solidified body constituting the cetyl alcohol equals over 40% of the actual amount of spermaceti taken, the theoretical yield (calculated) being about 45% of the amount of spermaceti used.

We have found by experimentation that the ideal temperature for the distillation of cetyl alcohol is from 330° to 350° C.

Having thus described our said invention, what we claim and desire to secure by Letters Patent is:—

1. The hereindescribed process which consists in saponifying a cetyl ester and separating the cetyl alcohol from the saponified mass by distillation, substantially as specified.

2. The hereindescribed process which consists in saponifying spermaceti and separating the cetyl alcohol from the saponified mass by distillation, substantially as specified.

3. The hereindescribed process which consists in saponifying a cetyl ester, subjecting the saponified mass to the action of heat to expel the water therefrom, and then subjecting the mass to the action of heat at a higher temperature to distil the cetyl alcohol therefrom, substantially as specified.

4. The hereindescribed process which consists in saponifying spermaceti, subjecting the saponified mass to the action of heat at a temperature of about 100° C. to expel the water therefrom, and then subjecting the mass to the action of heat at a temperature of about 340° C. to distil the cetyl alcohol therefrom, substantially as specified.

5. The hereindescribed process which consists in saponifying a cetyl ester with an oxid, and then separating the cetyl alcohol from the saponified mass by distillation, substantially as specified.

6. The hereindescribed process which consists in saponifying a cetyl ester with an oxid of a metal, and then separating the cetyl alcohol from the saponified mass by distillation, substantially as specified.

7. The hereindescribed process which consists in saponifying a cetyl ester with an oxid of an alkaline earth metal, and then separating the cetyl alcohol from the saponified mass by distillation, substantially as specified.

8. The herein described process which consists in saponifying a cetyl ester with calcium oxid, and then separating the cetyl alcohol from the saponified mass by distillation, substantially as specified.

Signed at the city of New York, in the county and State of New York, this 27th day of December, one thousand nine hundred and seventeen.

SOLOMON AXELRAD.
IRVING HOCHSTADTER.

Witnesses:
  CONRAD A. DIETERICH,
  WILLIAM P. JONES.